(12) United States Patent
Zheng et al.

(10) Patent No.: US 11,515,716 B2
(45) Date of Patent: Nov. 29, 2022

(54) WIRELESS CHARGING DEVICE

(71) Applicant: SHENZHEN LINGYI INNOVATION TECH CO., LTD., Shenzhen (CN)

(72) Inventors: Yanghui Zheng, Shenzhen (CN); Zhiteng Gan, Shenzhen (CN); Sen Chou, Shenzhen (CN); Yanghong Zheng, Shenzhen (CN); Liang Shao, Shenzhen (CN); Jingyan Zheng, Shenzhen (CN)

(73) Assignee: SHENZHEN LINGYI INNOVATION TECH CO., LTD., Shenzhen (CN)

( * ) Notice: Subject to any disclaimer, the term of this patent is extended or adjusted under 35 U.S.C. 154(b) by 105 days.

(21) Appl. No.: 17/262,233

(22) PCT Filed: Nov. 2, 2018

(86) PCT No.: PCT/CN2018/113593
§ 371 (c)(1),
(2) Date: Jan. 22, 2021

(87) PCT Pub. No.: WO2020/019567
PCT Pub. Date: Jan. 30, 2020

(65) Prior Publication Data
US 2021/0305825 A1    Sep. 30, 2021

(30) Foreign Application Priority Data
Jul. 24, 2018   (CN) .......................... 201810817193.8

(51) Int. Cl.
*H01M 10/46* (2006.01)
*H02J 7/00* (2006.01)
(Continued)

(52) U.S. Cl.
CPC ............ *H02J 7/0044* (2013.01); *H02J 50/10* (2016.02); *H04B 1/3827* (2013.01)

(58) Field of Classification Search
CPC ........ H02J 7/0044; H02J 7/0042; H02J 50/10; H02J 50/90; H02J 50/005; H04B 1/3883; H04B 1/3827
(Continued)

(56) References Cited

U.S. PATENT DOCUMENTS

2020/0328017 A1* 10/2020 Isenberg .................. H04M 1/11

FOREIGN PATENT DOCUMENTS

| CN | 205829229 U | 12/2016 |
| CN | 205911765 U | 1/2017 |

(Continued)

OTHER PUBLICATIONS

International Search Report issued in corresponding International application No. PCT/CN2018/113593, dated Apr. 24, 2019(6 pages).
(Continued)

*Primary Examiner* — Edward Tso

(57) ABSTRACT

A wireless charging device capable of changing an inclination angle of a mobile phone during charging comprises a supporting body and a rotating body. A charging surface is disposed on one end of the rotating body. The supporting body supplies power to the charging surface. The supporting body is rotatably connected with the other end of the rotating body. The inclination angle of the charging surface changes with the rotation of the rotating body. The wireless charging device is provided with the rotating body rotatably connected with the supporting body, which in turn changes the inclination angle of the charging surface conveniently.

20 Claims, 11 Drawing Sheets

(51) Int. Cl.
*H02J 50/10* (2016.01)
*H04B 1/3827* (2015.01)

(58) Field of Classification Search
USPC .......................................... 320/108, 114, 115
See application file for complete search history.

(56) References Cited

FOREIGN PATENT DOCUMENTS

| | | |
|---|---|---|
| CN | 206481115 U | 9/2017 |
| CN | 207504596 U | 6/2018 |

OTHER PUBLICATIONS

Written Opinion of the International Searching Authority for No. PCT/CN2018/113593.

* cited by examiner

WIRELESS CHARGING DEVICE

TECHNICAL FIELD

The present disclosure relates to the technical field of charging, particularly to a wireless charging device.

BACKGROUND

A wireless charger is a charging device for generating an alternating magnetic field by, a transmitting coil and a corresponding coupling magnetic field and a charging current utilizing an electromagnetic induction principle. The wireless charger is capable of wirelessly charging multiple to-be-charged terminals such as a mobile phone, a MP3, a tablet computer and an electronic reader.

At present, the wireless charger for charging the mobile phone has the following disadvantages that the mobile phone may be only horizontally placed on the wireless charger, and it is impossible to rotate the mobile phone and change an angle of placing the mobile phone according to situations and habits. As such, the wireless charger is inconvenient for use by a user.

SUMMARY

Technical Problem

A technical problem to be solved by the present disclosure is to provide a wireless charging device capable of conveniently changing an inclination angle of a mobile phone during charging.

Solution to the Problem

Technical Solution

In order to solve the above technical problem, a technical solution employed by the present disclosure is described as follows.

A wireless charging device includes a supporting body and a rotating body. A charging surface is formed on one end of the rotating body. The supporting body supplies power to the charging surface. The other end of the rotating body is rotatably connected with the supporting body. An inclination angle of the charging surface changes with the rotation of the rotating body.

Beneficial Effects of the Present Disclosure

Beneficial Effects

The present disclosure has the beneficial effects that the supporting body supplies power to the charging surface and further wirelessly charges the mobile phone placed on the charging surface. The rotating body is rotated. When the inclination angle of the charging surface changes with the rotation of the rotating body, an angle of a display screen of the mobile phone changes therewith. A user may ensure that the mobile phone is at a desired angle by rotating the rotating body according to his or her own or environmental requirements.

Figure 1:
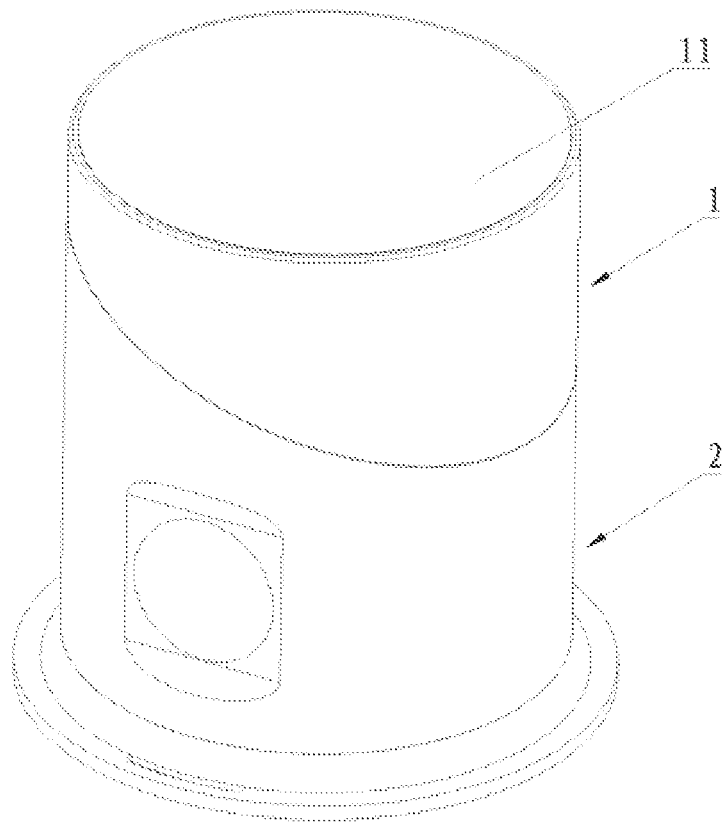
FIG. 1 is a structural schematic diagram showing a wireless charging device according to a first embodiment of the present disclosure in a state in which no mobile phone is placed.

REFERENCE NUMERALS 1. rotating body; 11. charging surface
2. supporting body; 211. arc-shaped groove
3. first inclined surface; 31. first magnet; 32. electric connecting sheet; 33. third magnet
4. fourth inclined surface; 31. second magnet; 32. electric contact; 33. fourth magnet
5, groove
6. projection
7. supporting member; 71, engaging groove
8. limiting hole
9. hole for power cable for a power cable

DESCRIPTION OF THE EMBODIMENTS

Implementations of the Present Disclosure
The technical contents, the achieved objective and effects of the present disclosure will be explained in detail in conjunction with embodiments with reference to accompanying drawings.

The most critical concept of the present disclosure consists in providing a rotating body rotatably connected with the supporting body, which in turn conveniently changes an inclination angle of a charging surface.

Figure 2:
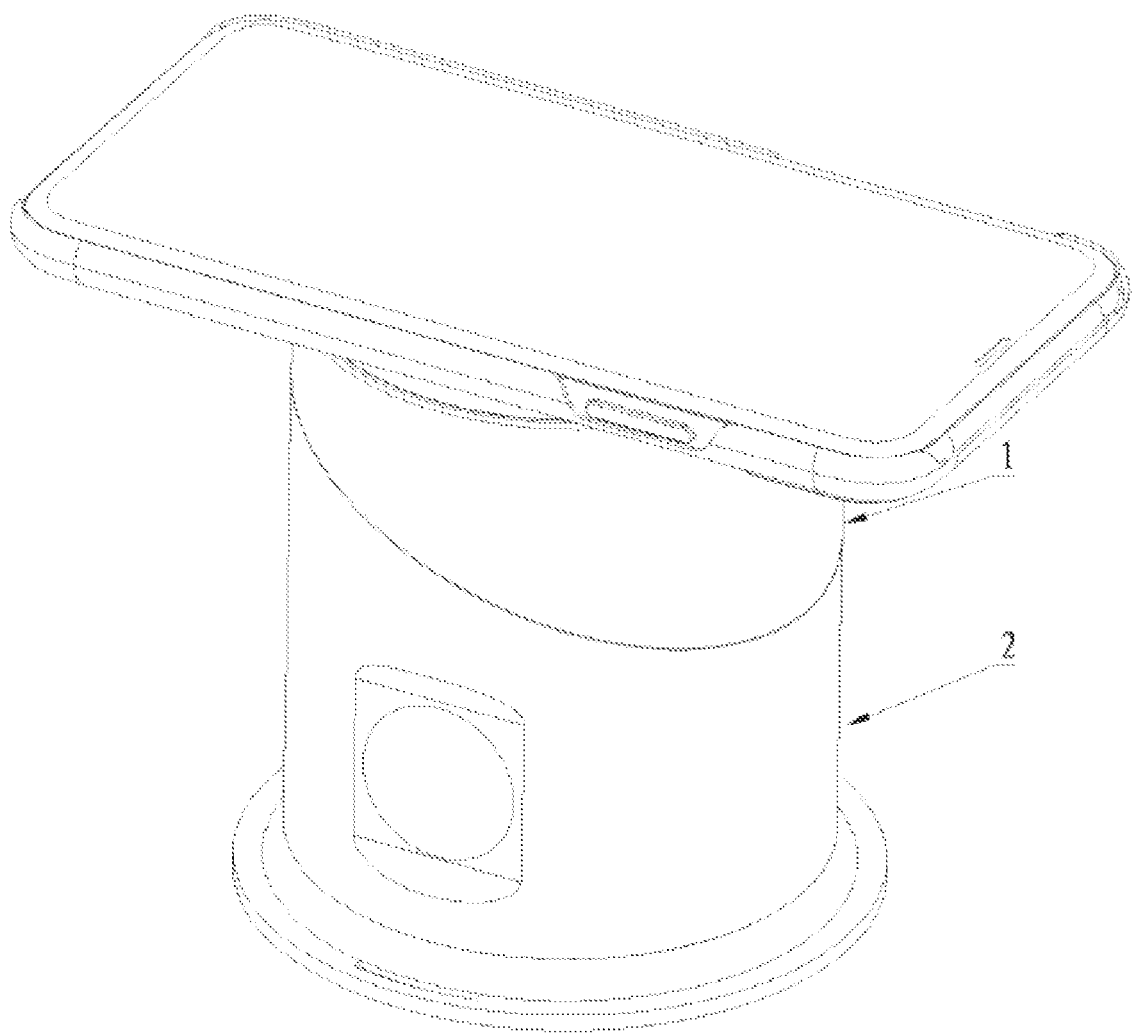
FIG. 2 is structural a schematic diagram showing a wireless charging device in a state according to the first embodiment of the present disclosure in which a mobile phone is placed.
Figure 3:
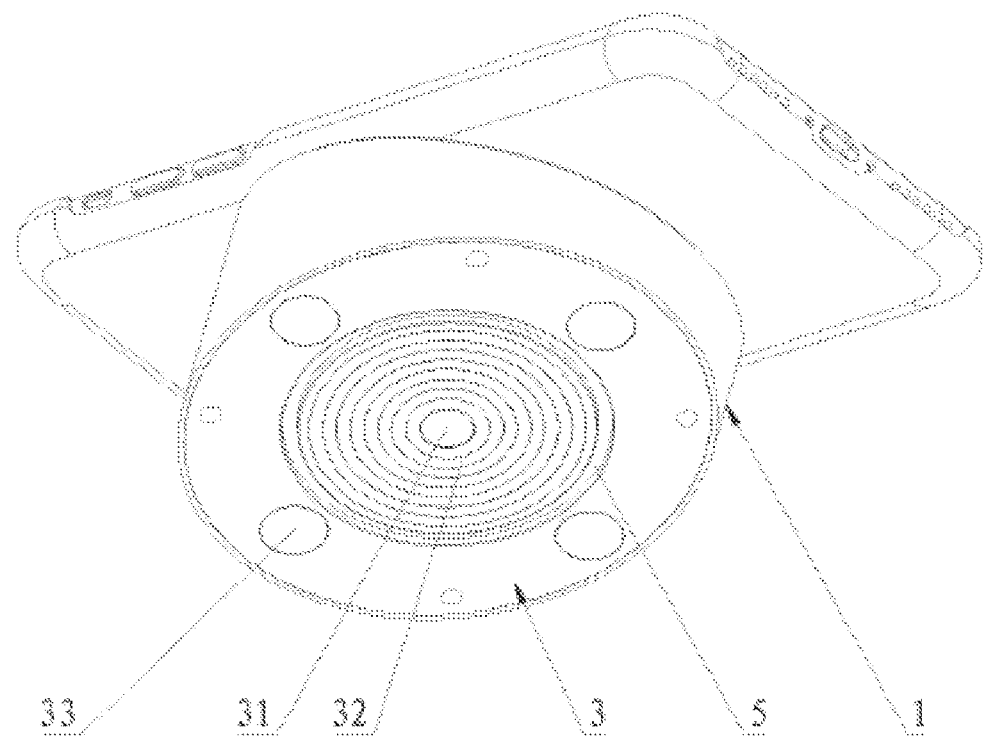
FIG. 3 is a structural schematic diagram showing a rotating body of the wireless charging device according to the first embodiment of the present disclosure.
Figure 4:
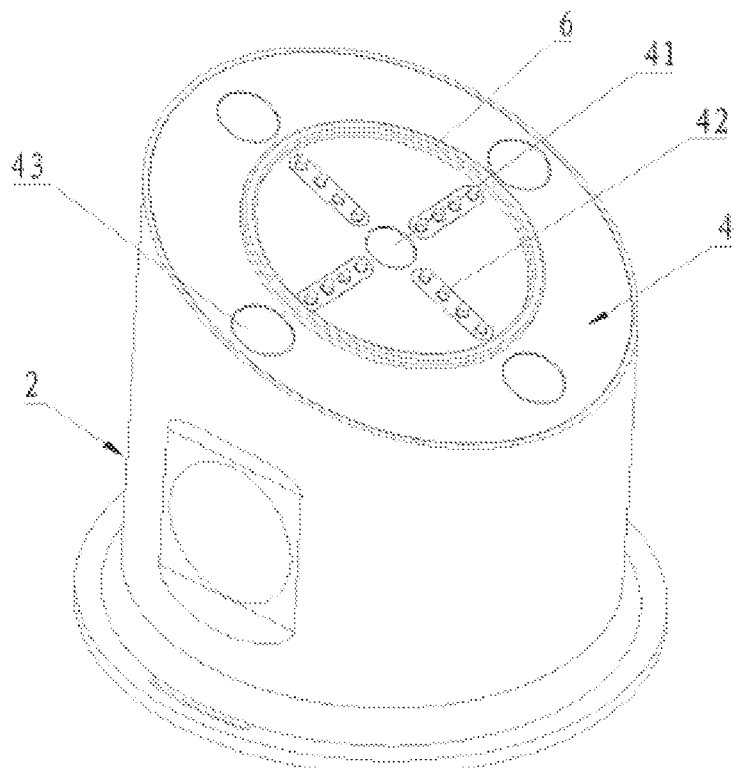
FIG. 4 is a structural schematic exploded diagram showing a supporting body of the wireless charging device according to the first embodiment of the present disclosure.
Figure 5:
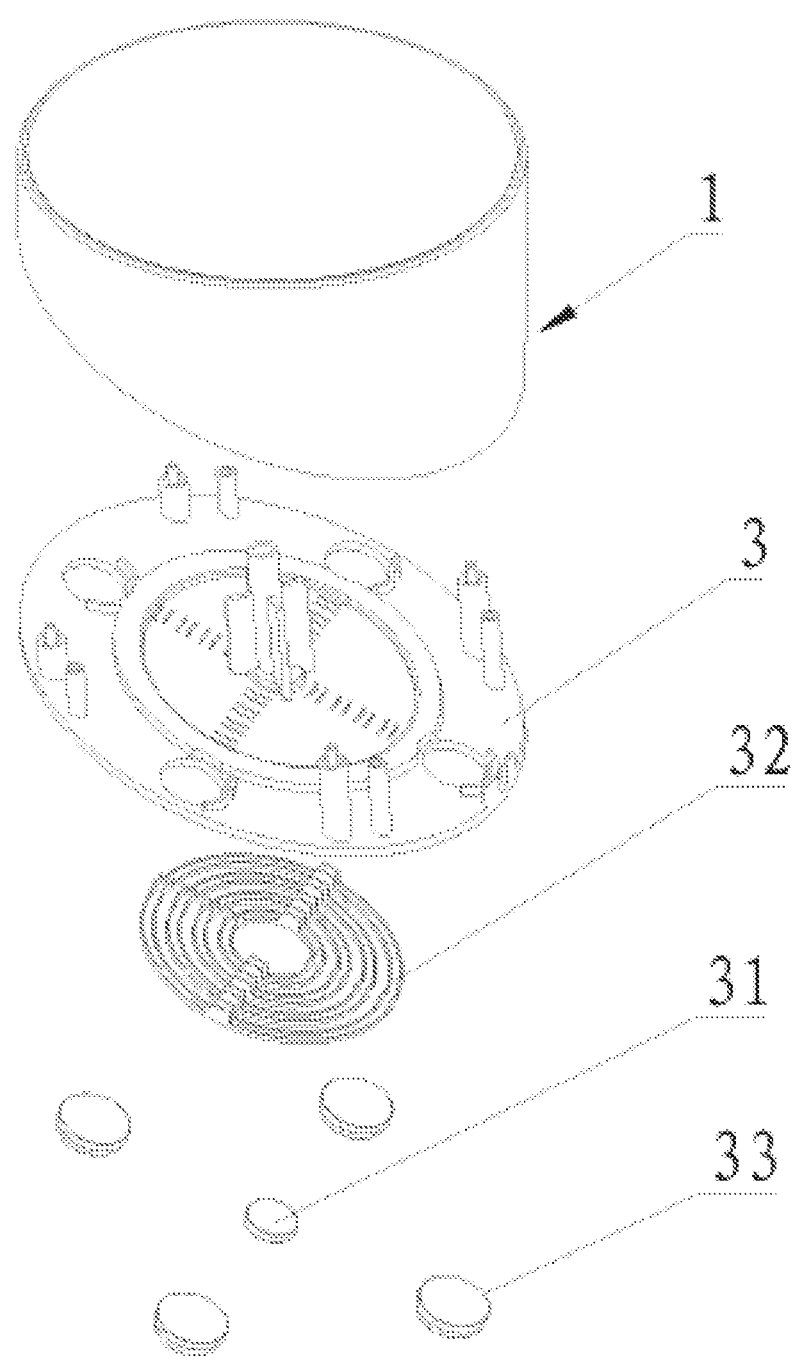
FIG. 5 is a structural schematic exploded diagram showing a rotating body of the wireless charging device according to a first embodiment of the present disclosure.
Figure 6:
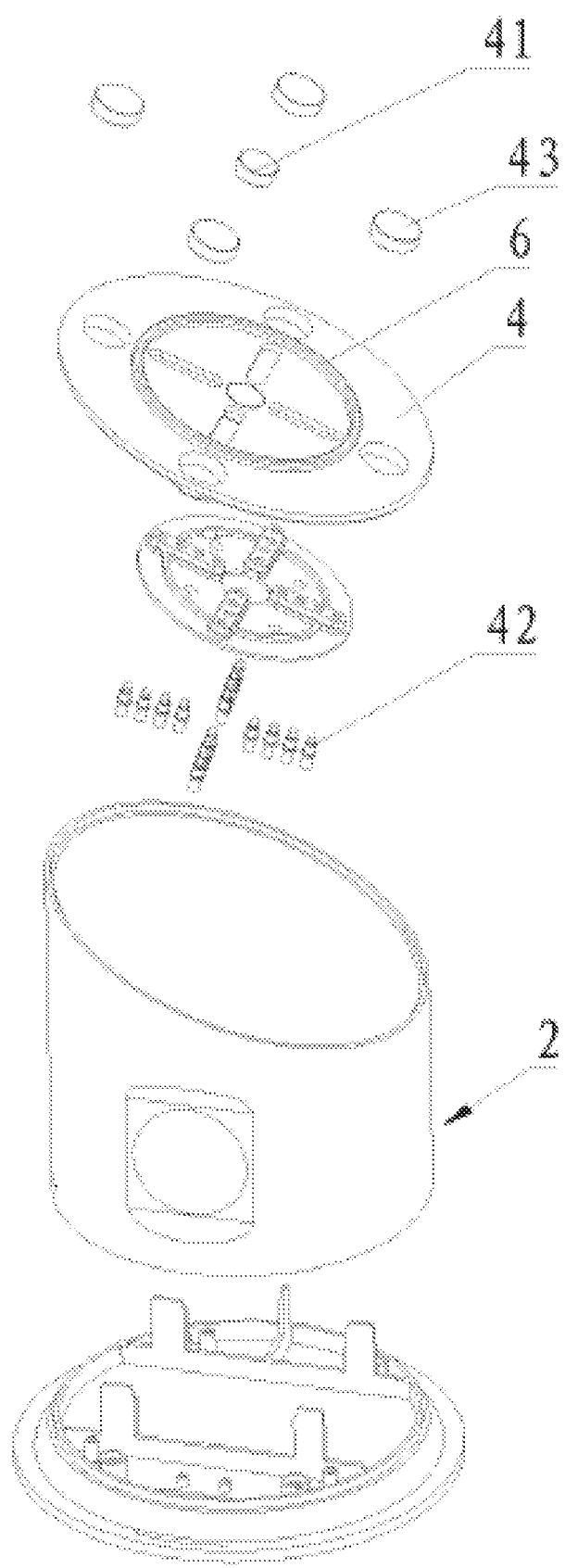
FIG. 6 is a structural schematic exploded diagram showing a supporting body of the wireless charging device according to the first embodiment of the present disclosure.
Figure 7:
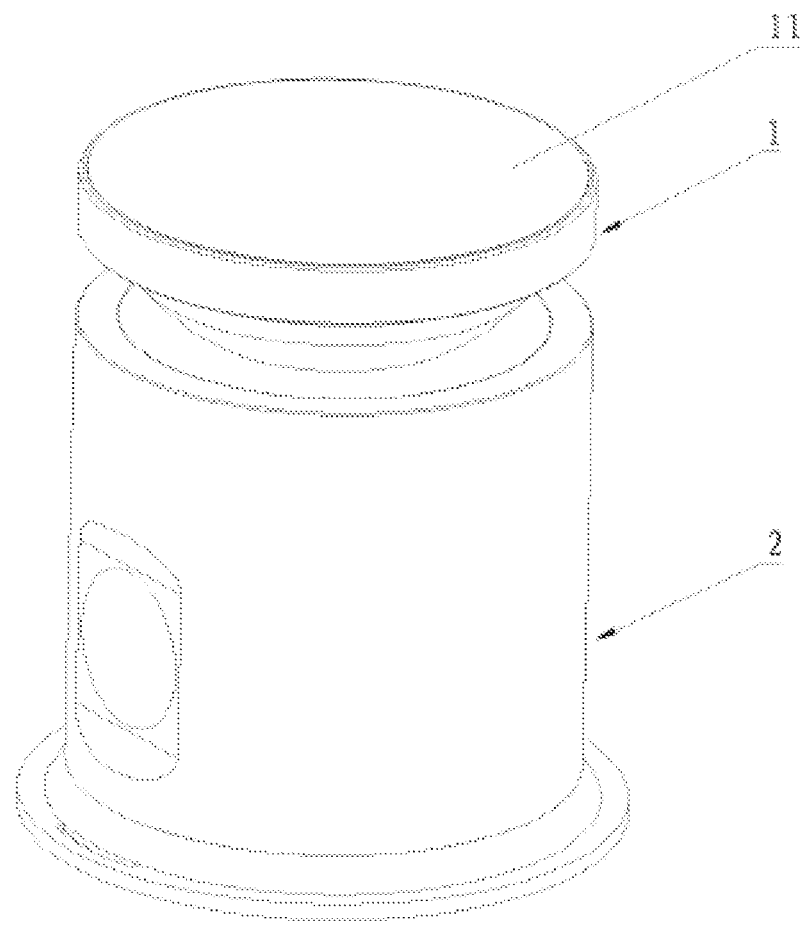
FIG. 7 is a structural schematic diagram showing a wireless charging device according to a second embodiment of the present disclosure in a state in which no mobile phone is placed.
Figure 8:
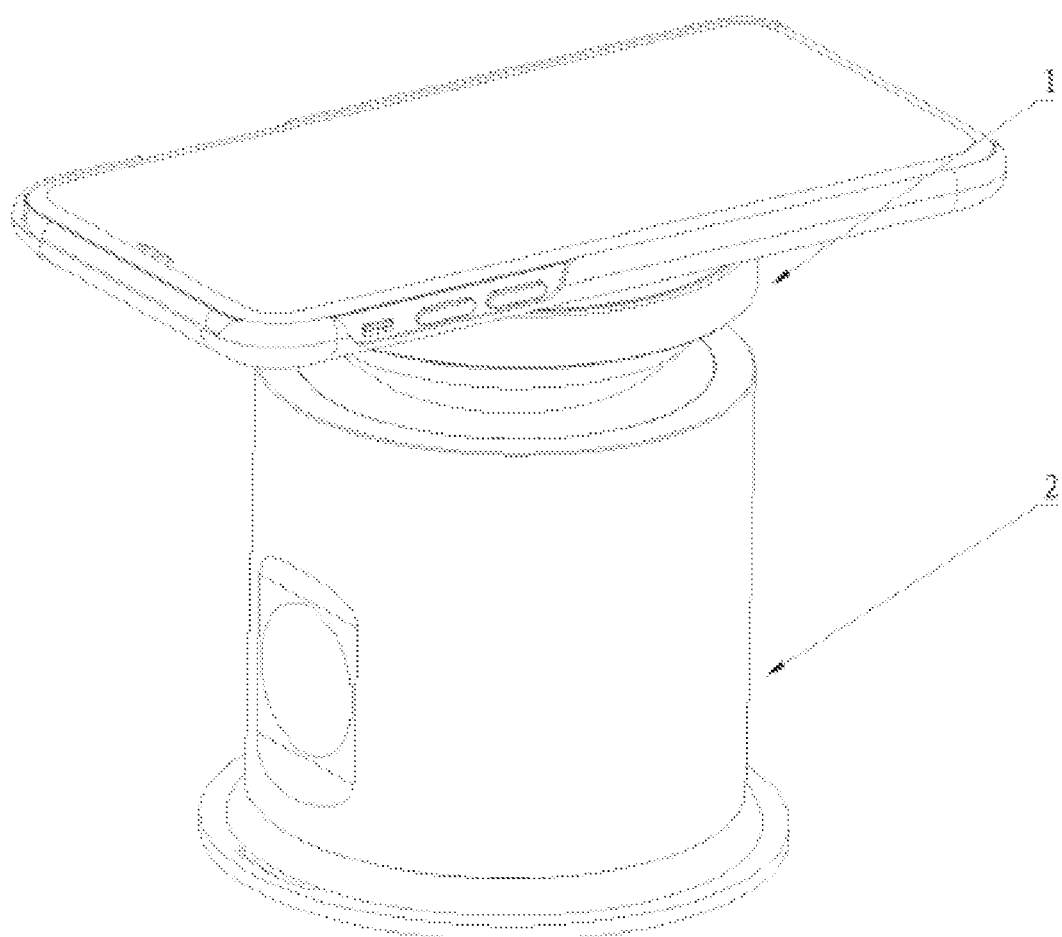
FIG. 8 is a structural schematic diagram showing the wireless charging device according to the second embodiment of the present disclosure in a state in which a mobile phone is placed.
Figure 9:
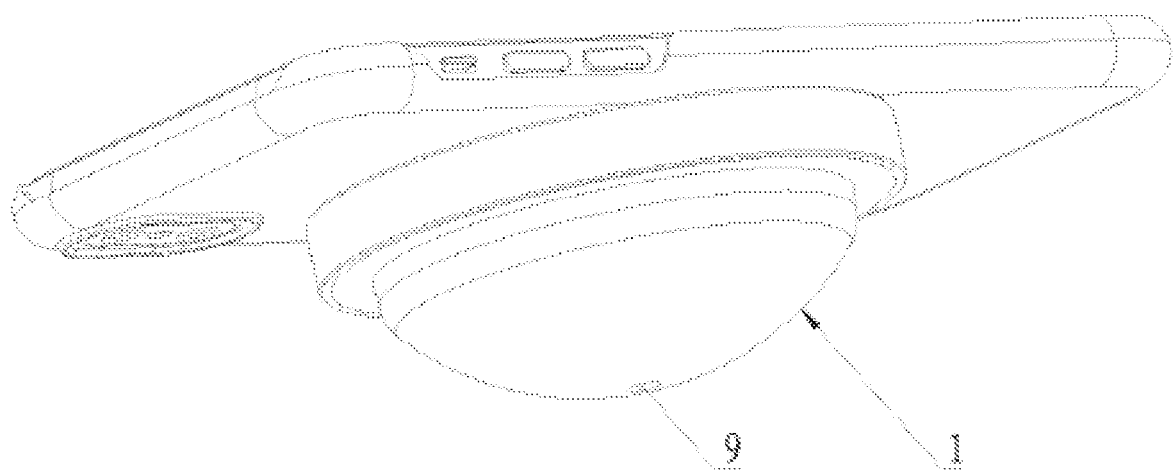
FIG. 9 is a structural schematic diagram showing a rotating body of the wireless charging device according to the second embodiment of the present disclosure.
Figure 10:
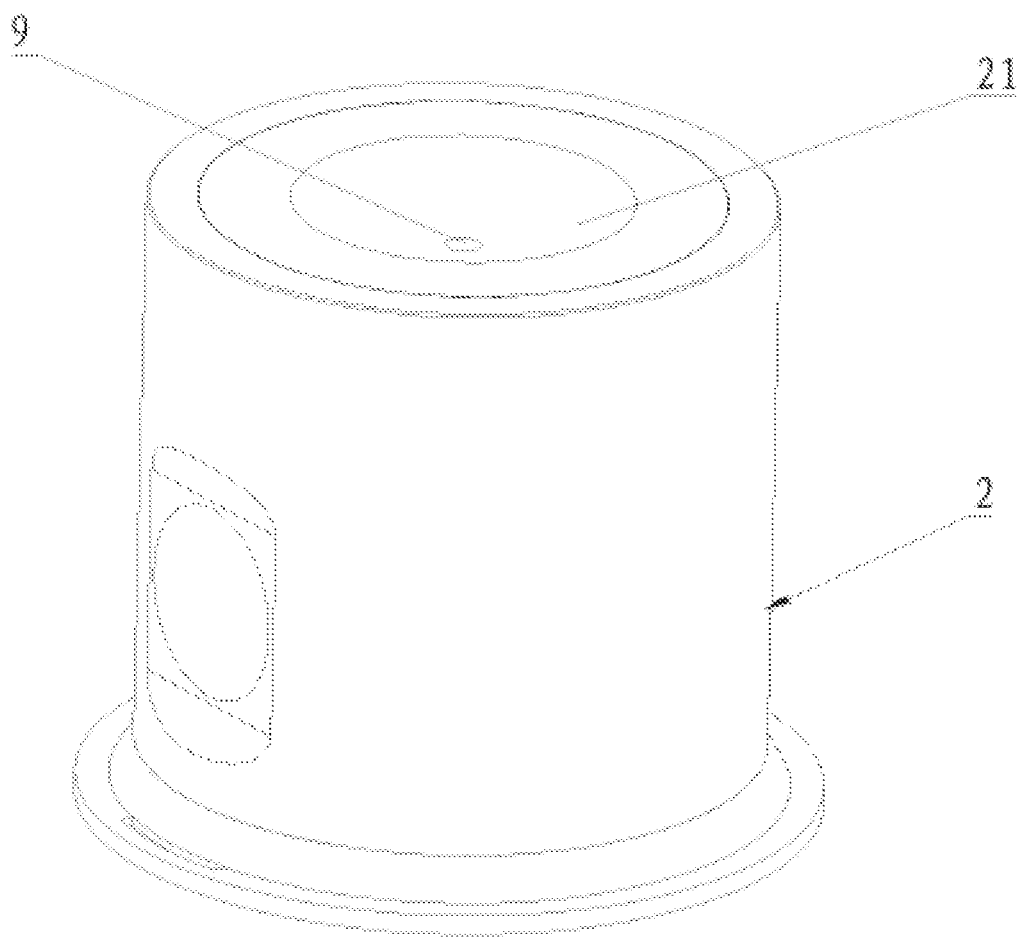
FIG. 10 is a structural schematic diagram showing a supporting body of the wireless charging device according to the second embodiment of the present disclosure.
Figure 11:
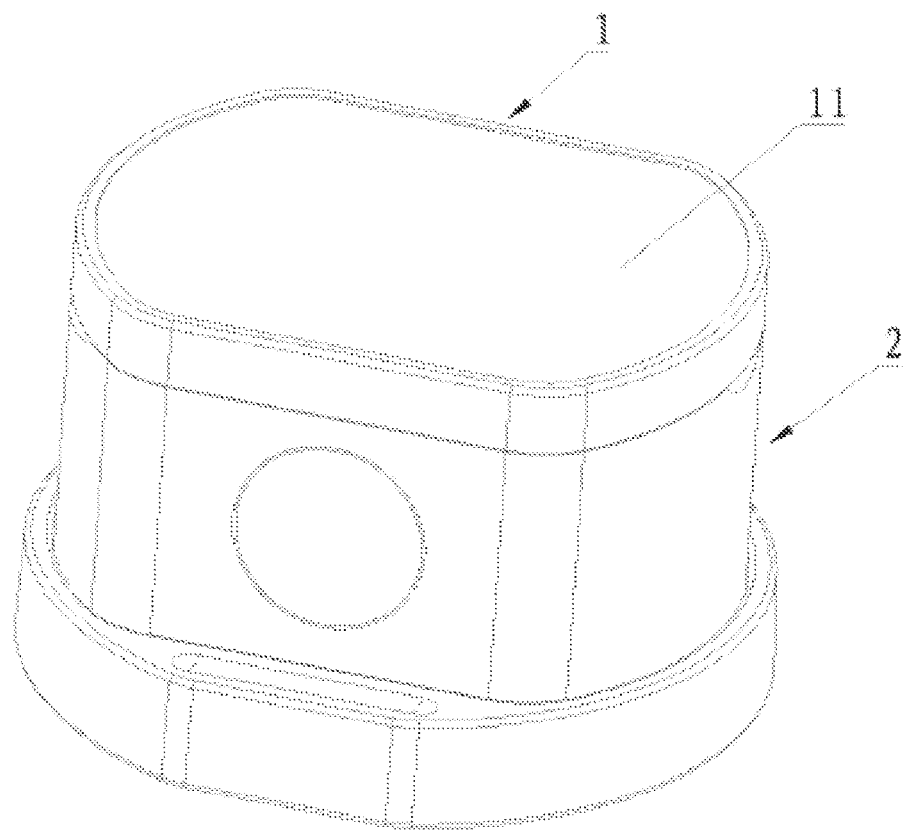
FIG. 11 is a structural schematic diagram showing a wireless charging device according to a third embodiment of the present disclosure in a state in which no mobile phone is placed.
Figure 12:
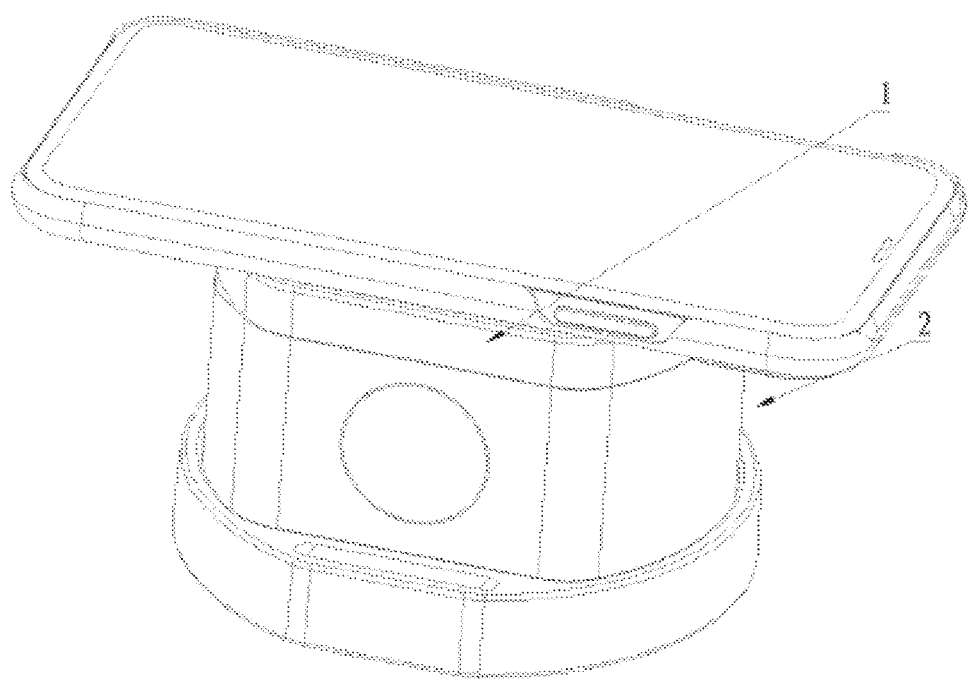
FIG. 12 is a structural schematic diagram showing the wireless charging device according to the third embodiment of the present disclosure in a state in which a mobile phone is placed.
Figure 13:
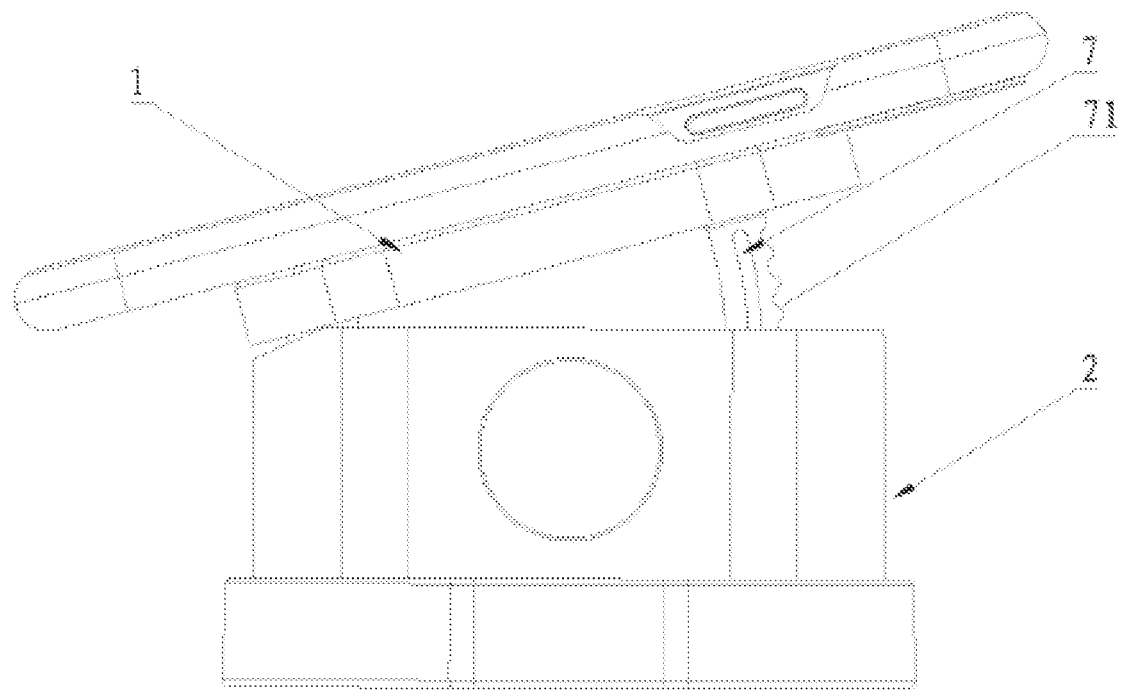
FIG. 13 is a schematic side view showing the wireless charging device according to the third embodiment of the present disclosure, with a rotating body in a rotating state.
Figure 14:
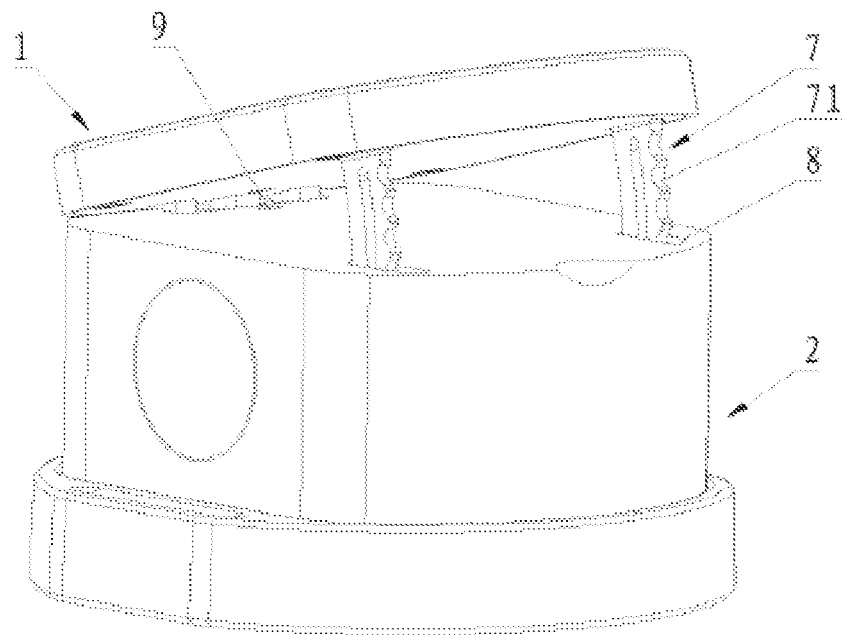
FIG. 14 is a structural schematic diagram showing the wireless charging device according to the third embodiment of the present disclosure, with a rotating body in a rotating state.
Figure 15:
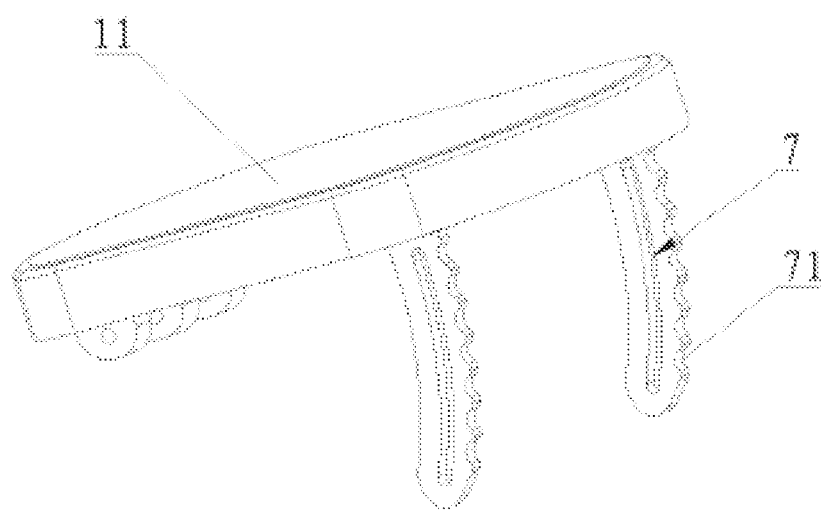
FIG. 15 is a structural schematic diagram showing the wireless charging device according to the third embodiment of the present disclosure, with a rotating body and a supporting member in a connecting state.

With reference to FIG. 1 to FIG. 15, a wireless charging device includes a supporting body 2 and a rotating body 1. A charging surface 11 is disposed on one end of the rotating body 1. The supporting body 2 supplies power to the charging surface 11. The other end of the rotating body 1 is rotatably connected with the supporting body 2. An inclination angle of the charging surface 11 changes with the rotation of the rotating body 1.

An operating principle of the present disclosure is described as follows. A wireless charging coil is disposed within the rotating body in advance. The supporting body may supply power to the wireless charging coil through an external power supply or a built-in power supply. After energizing the supporting body, a user places the mobile phone on the charging surface, and rotates the rotating body when needing to change the inclination angle of the mobile phone, thereby changing the inclination angle of the mobile phone by changing the charging surface, that is, a supporting surface of the mobile phone.

According to the above description, the present disclosure has the beneficial effect that the supporting body supplies power to the charging surface and then wirelessly charges the mobile phone placed on the charging surface. The rotating body is rotated. When the inclination angle of the charging surface changes with the rotation of the rotating body, an angle of a display screen of the mobile phone changes therewith. The user may ensure that the mobile phone is at a desired angle by rotating the rotating body according to his or her own or environmental requirements.

Further, a surface of the other end of the rotating body 1 is inclined with respect to the charging surface 11 to form a first inclined surface 3, and an end surface, which is close to the rotating body 1, of the supporting body 2 is arranged corresponding to the first inclined surface 3 to form a second inclined surface 4.

According to the above description, since the first inclined surface 3 is inclined with respect to the charging surface 11, the charging surface 11 may have different inclination angles by rotating the rotating body 1. A range of the inclination angle is determined by the inclination angle between the first inclined surface 3 and the charging surface 11.

Further, at least one electrical connecting sheet 32 is disposed on the first inclined surface 3. At least one set of electrical contacts 42 is disposed on the second inclined surface 4. The at least One set of electrical contacts 42 is respectively in one-to-one corresponding abutment with the at least one electrical connecting sheet 32.

Further, at least one electrical connecting sheet 32 is disposed on the second inclined surface 4. At least one set of electrical contacts 42 is disposed on the first inclined surface 3. The at least one set of electrical contacts 42 is respectively in one-to-one corresponding abutment with the at least one electrical connecting sheet 32.

According to the above description, the supporting body 2 supplies power to the charging surface 11 by means of electrical contact between the at least electrical connecting sheet 32 and the at least one set of electrical contacts 42, so as to avoid possible problems such as line distortion and deflection or breakage in a process of supplying power via a power cable when the rotating body 1 is rotated.

Further, a first magnet 31 is disposed on the center of the first inclined surface 3, and a second magnet 41 corresponding to the first magnet 31 is disposed on the center of the second inclined surface 4.

According to the above description, the rotating body 1 is connected with the supporting body 2 by means of a magnetic force between the first magnet 31 and the second magnet 41. When the user rotates the rotating body 1 around a central axis of the inclined surface, the inclination angle of the charging surface 11 is changed without separating the rotating body 1 from the supporting body 2.

Further, at least two third magnets 33 are disposed on the first inclined surface 3. The third magnets 33 are evenly distributed around the first magnet 31. Fourth magnets 43 corresponding to the third magnets 33 are disposed on the second inclined surface 4.

According to the above description, in addition to the magnetic force between the first magnet 41 and the second magnet 51, there is a magnetic force between the third magnets 43 and the fourth magnets 53 to attract the first inclined surface 3 and the second inclined surface 4 together. After the rotating body 1 is rotated for a certain angle, all the third magnets 33 and all the fourth magnets 42 are overlapped in a one-to-one correspondence manner again along an axial direction of the inclined surface, ensuring that the rotating body 1 and the supporting body 2 are stably connected and the wireless charging device is difficult to shake.

Further, the electrical connecting sheet 32 is annular, and the electrical connecting sheet 32 is arranged coaxially with distribution circles of the third magnets 33.

According to the above description, since the electrical connecting sheet 32 is annular and the center of a circle in which the electrical connecting sheet 32 is located is the center of the inclined surface, when the rotating body 1 is rotated around the central axis of the inclined surface, each set of electrical contacts 4 is always electrically connected with the corresponding electrical connecting sheet 32, and the supporting body 2 continuously supplies power to the charging surface 11, so that the inclination angle of the mobile phone may be changed without interrupting the charging of the mobile phone.

Further, an annular groove 5 is provided in the first inclined surface 3. The groove 5 is arranged coaxially with the electrical connecting sheet 32. A projection 6 matched with the groove 5 is disposed on the second inclined surface 4.

According to the above description, the annular groove 5 is matched with the annular projection 6. When the supporting body 2 is connected with the rotating body 1, the projection 6 is embedded within the groove 5, and thus the rotating body 1 is difficultly separated from the supporting body 2 during rotating.

Further, the rotating body 1 is connected with the supporting body 2 by means of a magnetic force.

According to the above description, there will be no component interference when the rotating body 1 and the supporting body 2 which are connected by means of the magnetic force rotate relative to each other, resulting a relatively long service life.

Further, a surface of the other end of the rotating body 1 is a convex arc surface. An arc-shaped groove 21 is provided in an end surface, which is connected with the rotating body 1, of the supporting body 2. The rotating body 1 is rotatably embedded within the arc-shaped groove 21.

According to the above description, the surface of the other end of the rotating body 1 is the convex arc surface. In this way, the inclination angle of the charging surface 11 may be changed by rotating the rotating body 1 within the arc-shaped groove 21.

Further, holes for power cable 9 are respectively provided in the center of the other end of the rotating body 1 and the center of the arc-shaped groove 21.

According to the above description, a power cable within the supporting body 2 extends into the rotating body 1 through the hole for power cable 9, so as to supply power to the charging surface 11. The holes for power cable 9 are located in the center of the arc-shaped groove 21 and the center of the other end of the rotating body 1. In this way, when the two holes for power cable 9 are aligned, the power cable is hidden. When the rotating body 1 is rotated, a distance in which the power cable is pulled is relatively small, resulting in a relatively long service life.

Further, one side of the other end of the rotating body 1 is rotatably connected with the supporting body 2, and a telescopic supporting member 7 is disposed between the other side of the other end of the rotating body 1 and the supporting body 2.

According to the above description, the telescopic supporting member 7 plays a role in supporting the rotating body 1 after the rotating body 1 is rotated, so as to ensure that, the rotating body 1 will not restore after an external force is removed.

Further, a limiting hole 8 is provided in one side, which is close to the rotating body 1, of the supporting body 2, and one end of the supporting member 7 passes through the limiting hole 8 and extends into the supporting body 2.

According to the above description, the rotating body 1 may be prevented from shifting after rotating by providing the limiting hole 8 and disposing the supporting member 7 in the limiting hole 8, while the supporting member 7 extends into the supporting body 2. When the rotating body 1 and the supporting body 2 are in a preset closest state, the supporting member 7 may be hidden within the supporting body 2.

Further, the supporting member 7 is arc-shaped, and the center of a circle where the arc-shaped supporting member 7 is located is located is positioned on a rotating shaft between the rotating body 1 and the supporting body 2.

According to the above description, a position of the arc-shaped supporting member 7 designed above that passes through the surface of the supporting body 2 during the rotation of the rotating body 1 will not change, so that the supporting member 7 may be limited by using the smaller limiting hole 8.

Further, an arc-shaped engaging groove 71 is provided in a side wall of the supporting member 7, which faces towards an opening caused by the rotation of the rotating body rotates, and the supporting body 2 is internally provided with an engaging portion matched with the engaging groove 71.

According to the above description, the engaging groove 71 is designed to be arc-shaped, so that the engaging portion and the engaging groove 71 play a certain role in fixing without being blocked. When a rotating member 2 is rotated, the supporting member 7 will not be pulled out due to blockage, and there is an enough supporting force for the mobile phone and the rotating body 1.

Further, holes for power cable 9 are respectively provided in a position, which is close to a joint of the rotating body 1 and the supporting body 2, of the rotating body 1 and a position, which is close to the joint of the rotating body 1 and the supporting body 2, of the supporting body 2.

According to the above description, the advantage of providing the hole for power cable 9 in the position which is close to the rotating body 1 and the supporting body 2 is in that the pulling of the power cable between the supporting body 2 and the rotating body 1 during the rotation of the rotating body 1 may be reduced to the greatest extent. Meanwhile, after the rotating body 1 is rotated, the exposed power cable is shortened.

With reference to FIG. 1 to FIG. 6, a first embodiment of the present disclosure is described as follows.

A wireless charging device includes a supporting body 2 and a rotating body 1. A charging surface 11 is disposed on one end of the rotating body 1. A surface of the other end of the rotating body 1 is inclined with respect to the charging surface 11 to form a first inclined surface 3. An end surface, which is close to the rotating body 1, of the supporting body 2 is arranged corresponding to the first inclined surface 3 to form a second inclined surface 4.

A first magnet 31 and at least two third magnets 33 are disposed on the center of the first inclined surface 3. A second magnet 41 corresponding to the first magnet 31 is disposed on the center of the second inclined surface 4. The third magnets 33 are evenly distributed around the first magnet 31. Fourth magnets 43 corresponding to the third magnets 33 are disposed on the second inclined surface 4.

A surface of the first magnet 31 and surfaces of the third magnets 33 are respectively flush with a surface of the first inclined surface 3.

A surface of the second magnet 41 and surfaces of the fourth magnet 43 are respectively flush with a surface of the second inclined surface 4.

At least one electrical connecting sheet 32 is disposed on the first inclined surface 3. At least one set of electrical contacts 42 is disposed on the second inclined surface 4. The at least one electrical contact 42 is respectively in one-to-one corresponding abutment with the at least one electrical connecting sheet 32. The electrical connecting sheet 32 is annular. The electrical connecting sheet 32 is arranged coaxially with distribution circles of the third magnets 33. The supporting body 2 is connected with an external power supply and supplies power to the charging surface 11 within the rotating body 1 via an electrical connection of the electric contact and the electrical connecting sheet.

An annular groove 5 is provided in the first inclined surface 3. The groove 5 is arranged coaxially with the electrical connecting sheet 32. A projection 6 matched with the groove 5 is disposed on the second inclined surface 4.

In this embodiment, a user may change the inclination angle of the charging surface 11 by rotating the rotating body 1 around an axis perpendicular to the center of the inclined surface.

With reference to FIG. 7 to FIG. 10, a second embodiment of the present disclosure is described as follows.

A wireless charging device includes a supporting body 2 and a rotating body 1. A charging surface 11 is disposed on one end of the rotating body 1. A surface of the other end of the rotating body 1 is a convex arc surface. An arc-shaped groove 21 is provided in an end surface, which is connected with the rotating body 1, of the supporting body 2. The rotating body 1 is rotatably embedded within the arc-shaped groove 21. Holes for power cable 9 are respectively provided in the center of the other end of the rotating body 1 and the center of the arc-shaped groove 21.

In this embodiment, a power cable within the supporting body 2 sequentially passes through the hole for power cable 9 in the arc-shaped groove 21 and the hole for power cable 9 in the rotating body 1 and extends into the rotating body 1, so as to supply power to the charging surface 11. A user changes an inclination angle of the charging surface 11 by inclining and rotating the rotating body 1.

With reference to FIG. 11 to FIG. 15, a third embodiment of the present disclosure is described as follows.

A wireless charging device includes a supporting body 2 and a rotating body 1. A charging surface 11 is disposed on one end of the rotating body 1. One side of the other end of the rotating body 1 is rotatably connected with the supporting body 2. A telescopic supporting member 7 is disposed between the other side of the other end of the rotating body 1 and the supporting body 2. A limiting hole 8 is provided in one side, which is close to the rotating body 1, of the supporting body 2. One end of the supporting member 7 passes through the limiting hole 8 and extends into the supporting body 2. The supporting member 7 is arc-shaped. The center of a circle in which the arc-shaped support member 7 is located is positioned on a rotating shaft between the rotating body 1 and the supporting body 2. An arc-shaped engaging groove 71 is disposed in a side wall of the supporting member 7, which faces towards an opening caused by the rotation of the rotating body 1. An engaging portion matched with the engaging groove 71 is disposed within the supporting body 2.

Holes for power cable 9 are respectively provided in a position, which is close to a joint of the rotating body 1 and the supporting body 2, of the rotating body 1, and a position, which is close to the joint of the rotating body 1 and the supporting body 2, of the supporting body 2.

In this embodiment, a power cable within the supporting body 2 sequentially passes through the hole for power cable 9 in the supporting body 2 and the hole for power cable 9 in the rotating body 1 and extends into the rotating body 1 to supply power to the charging surface 11. A user pulls the other side of the other end of the rotating body 1, so as to rotate the rotating body 1 and change an inclination angle of the charging surface 11.

In summary, the present disclosure provides the wireless charging device capable of conveniently changing the inclination angle of the mobile phone during charging. The supporting body of the wireless charging device supplies power to the charging surface and then wirelessly charges the mobile phone placed on the charging surface. The rotating body is rotated. When the inclination angle of the charging surface changes with the rotation of the rotating body, the angle of the display screen of the mobile phone changes therewith. The user may ensure that the mobile phone is at a desired angle by rotating the rotating body according to his or her own or environmental requirements.

The above description is only preferred embodiments of the present disclosure, and is not intended to limit the patent protection scope of the present disclosure. All equivalent variations made by utilizing contents of the description and the accompanying drawings of the present disclosure are directly or indirectly applied in related technical fields, and encompassed within the scope of patent protection of the present disclosure.

What is claimed is:

1. A wireless charging device, comprising a supporting body and a rotating body, wherein a charging surface is formed on one end of the rotating body, the supporting body supplies power to the charging surface, an other end of the rotating body is rotatably connected with the supporting body, and an inclination angle of the charging surface is adjustable with the rotation of the rotating body;
   wherein a surface of the other end of the rotating body is inclined with respect to the charging surface to form as a first inclined surface, and an end surface of the supporting body adjacent to the rotating body is formed as a second inclined surface corresponding to the first inclined surface;
   wherein at least one electrical connecting sheet is provided on one of the first inclined surface and the second inclined surface, at least one set of electrical contacts is provided on an other one of the first inclined surface and the second inclined surface, and the at least one set of electrical contacts is corresponding to and abutting the at least one electrical connecting sheet;
   wherein a first magnet is arranged on a central portion of the first inclined surface, and a second magnet is arranged on a central portion of the second inclined surface corresponding to the first magnet.

2. The wireless charging device according to claim 1, wherein at least two third magnets are arranged on the first inclined surface, the third magnets are evenly distributed around the first magnet, and fourth magnets are disposed on the second inclined surface corresponding to the third magnets.

3. The wireless charging device according to claim 2, wherein the electrical connecting sheet is annular, and the electrical connecting sheet is arranged coaxially with a circle on which the third magnets are arranged.

4. The wireless charging device according to claim 3, wherein an annular groove is provided in the first inclined surface, the groove is arranged coaxially with the electrical connecting sheet, and a projection fitting with the groove is provided on the second inclined surface.

5. The wireless charging device according to claim 1, wherein the rotating body is connected with the supporting body by means of a magnetic force.

6. The wireless charging device according to claim 1, wherein a surface of the other end of the rotating body is a convex curved surface, an arc-shaped groove is provided in an end surface of the supporting body which is connected with the rotating body, and the rotating body is rotatably embedded within the arc-shaped groove.

7. The wireless charging device according to claim 6, wherein the rotating body is provided with a hole for a power cable at a central portion, and the arc-shaped groove is provided with a hole for the power cable at a central portion.

8. A wireless charging device, comprising a supporting body and a rotating body, wherein a charging surface is formed on one end of the rotating body, the supporting body supplies power to the charging surface an other end of the rotating body is rotatably connected with the supporting body, and an inclination angle of the charging surface is adjustable with the rotation of the rotating body;
   wherein one side of the other end of the rotating body is rotatably connected with the supporting body, and a telescopic supporting member is arranged between an other side of the other end of the rotating body and the supporting body.

9. The wireless charging device according to claim 8, wherein the supporting body is provided with a limiting hole in one side adjacent to the rotating body, and one end of the supporting member extends into the supporting body via the limiting hole.

10. The wireless charging device according to claim 9, wherein the supporting member is arc-shaped, and a center of a circle on which the arc-shaped supporting member is located is positioned on a rotating shaft which is arranged between the rotating body and the supporting body.

11. The wireless charging device according to claim 10, wherein an arc-shaped engaging groove is provided in a side wall of the supporting member which faces towards an opening caused by rotation of the rotating body, and an engaging portion corresponding to the engaging groove is provided within the supporting body.

12. The wireless charging device according to claim 8, wherein the rotating body is provided with a hole for a power cable at a position adjacent to a joint of the rotating body and the supporting body, and the supporting body is provided with a hole for the power cable at a position adjacent to the joint of the rotating body and the supporting body.

13. The wireless charging device according to claim 8, wherein a surface of the other end of the rotating body is inclined with respect to the charging surface to form as a first inclined surface, and an end surface of the supporting body adjacent to the rotating body is formed as a second inclined surface corresponding to the first inclined surface.

14. The wireless charging device according to claim 13, wherein at least one electrical connecting sheet is provided on one of the first inclined surface and the second inclined surface, at least one set of electrical contacts is provided on an other one of the first inclined surface and the second inclined surface, and the at least one set of electrical contacts is corresponding to and abutting the at least one electrical connecting sheet.

15. The wireless charging device according to claim 14, wherein a first magnet is arranged on a central portion of the first inclined surface, and a second magnet is arranged on a central portion of the second inclined surface corresponding to the first magnet.

16. The wireless charging device according to claim 15, wherein at least two third magnets are arranged on the first inclined surface, the third magnets are evenly distributed around the first magnet, and fourth magnets are disposed on the second inclined surface corresponding to the third magnets.

17. The wireless charging device according to claim 16, wherein the electrical connecting sheet is annular, and the electrical connecting sheet is arranged coaxially with a circle on which the third magnets are arranged.

18. The wireless charging device according to claim 17, wherein an annular groove is provided in the first inclined surface, the groove is arranged coaxially with the electrical connecting sheet, and a projection fitting with the groove is provided on the second inclined surface.

19. The wireless charging device according to claim 8, wherein the rotating body is connected with the supporting body by means of a magnetic force.

20. The wireless charging device according to claim 8, wherein a surface of the other end of the rotating body is a convex curved surface, an arc-shaped groove is provided in an end surface of the supporting body which is connected with the rotating body, and the rotating body is rotatably embedded within the arc-shaped groove.

\* \* \* \* \*